(12) United States Patent
Mohamed Ahmed et al.

(10) Patent No.: US 10,819,859 B2
(45) Date of Patent: Oct. 27, 2020

(54) UNIVERSAL DATA SPONSORSHIP SOLUTION (UDSS)

(71) Applicants: Ali Mohamed Ahmed, Toronto (CA); Rachid Zarita, Toronto (CA)

(72) Inventors: Ali Mohamed Ahmed, Toronto (CA); Rachid Zarita, Toronto (CA)

( * ) Notice: Subject to any disclaimer, the term of this patent is extended or adjusted under 35 U.S.C. 154(b) by 236 days.

(21) Appl. No.: 15/953,802

(22) Filed: Apr. 16, 2018

(65) Prior Publication Data

US 2018/0309879 A1    Oct. 25, 2018

Related U.S. Application Data

(60) Provisional application No. 62/487,719, filed on Apr. 20, 2017.

(51) Int. Cl.
*H04M 15/00* (2006.01)
*H04W 4/24* (2018.01)

(52) U.S. Cl.
CPC ........... *H04M 15/09* (2013.01); *H04M 15/58* (2013.01); *H04M 15/64* (2013.01); *H04M 15/75* (2013.01); *H04M 15/8033* (2013.01); *H04M 15/8083* (2013.01); *H04M 15/8214* (2013.01); *H04W 4/24* (2013.01); *H04M 2215/146* (2013.01); *H04M 2215/2026* (2013.01); *H04M 2215/32* (2013.01); *H04M 2215/66* (2013.01); *H04M 2215/7009* (2013.01)

(58) Field of Classification Search
CPC ...... H04M 15/09; H04M 15/58; H04M 15/64; H04M 15/75; H04M 15/8033; H04M 15/8083; H04M 15/8214; H04M 2215/146; H04M 2215/2026; H04M 2215/32; H04M 2215/66; H04M 2215/7009; H04W 4/24

See application file for complete search history.

(56) References Cited

U.S. PATENT DOCUMENTS

| | | | |
|---|---|---|---|
| 9,826,105 B2 * | 11/2017 | Sharma | H04M 15/8083 |
| 2009/0228361 A1 * | 9/2009 | Wilson | G06Q 30/0243 |
| | | | 705/14.42 |
| 2014/0094138 A1 * | 4/2014 | Saker | H04L 12/1407 |
| | | | 455/406 |

(Continued)

*Primary Examiner* — Khai M Nguyen

(74) *Attorney, Agent, or Firm* — Barnes & Thornburg LLP

(57) ABSTRACT

A system for creating and managing Sponsored Data Plans in a geographic area spanning across multiple mobile telecommunications networks includes a UDSS Portal to receive Sponsorship campaign parameters, and a UDSS Application Server to accept and propagate resulting policies and configurations to a relevant network operators' OCS and Sponsorship Application Server components based on the campaign targeted geographic areas received by the UDSS Application Server from the UDSS Portal. The system may include a UDSS Proxy Server to implement a mechanism to perform protocol and data integrity checks; and look up any active cached matching campaign parameters. The Sponsorship Application Server inside the operator's network may determine the operator's subscriber eligibility to the sponsored content. The system may include a UE to send a request for a sponsored content and an operator's PCEF to receive and forward the request to the Sponsorship Application Server for determination of sponsorship eligibility.

20 Claims, 6 Drawing Sheets

SPONSORSHIP CAMPAIGN CREATION FLOW

(56) References Cited

U.S. PATENT DOCUMENTS

| | | | |
|---|---|---|---|
| 2014/0244401 A1* | 8/2014 | Doughty | G06Q 30/0269 |
| | | | 705/14.66 |
| 2015/0156333 A1* | 6/2015 | Ford | H04M 15/09 |
| | | | 455/406 |
| 2017/0118622 A1* | 4/2017 | Jiang | H04W 8/12 |
| 2017/0142264 A1* | 5/2017 | Moon | H04M 15/8083 |
| 2017/0178193 A1* | 6/2017 | Jagannath | G06Q 30/0273 |
| 2020/0045519 A1* | 2/2020 | Raleigh | H04W 4/50 |

\* cited by examiner

FIG. 1: High-level Architecture and the Actors

END-TO-END UDSS COMPONENTS

UNIVERSAL SPONSORSHIP UDSS DATA MODEL EXAMPLE

SPONSORSHIP CAMPAIGN CREATION FLOW

UDSS END-TO-END CALL FLOW

UDSS END-TO-END CALL FLOW

UNIVERSAL DATA SPONSORSHIP SOLUTION (UDSS)

CROSS-REFERENCE TO RELATED APPLICATIONS

The present application claims the benefit of U.S. Provisional Patent Application No. 62/487,719, filed Apr. 20, 2017.

BACKGROUND

With the spread of wireless cellular data services and the multiplication of mobile applications that have created a market for very popular services like Uber, Facebook, banking apps and a multitude of other services, data allowances for subscribers is on the rise and cannot keep up with the demand because of the rapid rise in data based services. Operators offer tiered data allowances to attract customers and the demand keeps growing.

SUMMARY OF THE INVENTION

The present invention provides a method for the creation, management and tracking of Data Sponsorship Campaigns in a mobile operator's network. The method defines a process by which a Sponsor '100' creates and configures a Sponsorship Campaign as shown in the flow on FIG. IV. The sponsorship campaign is initiated at '21' and provides the campaign parameters such as sponsor id (SP_ID), campaign id (CMP_ID), sponsored service group id (SSG_ID), sponsored applications services id (SAS_ID) and other parameters as required. via the UDSS portal '200'. The UDSS application server '201' relays the above campaign parameters to the OCS '402' through the operator's exposed Application Programming Interface (API) '403' to create the initial campaign identifiers into the operator's online billing system. The flow continues by adding the sponsored service URL(s) in the operator's sponsorship application server '400' via step '26' in FIG. IV. From this point on, the operator's network infrastructure is ready to detect and apply appropriate billing rules that materialize the execution and enforcement of the sponsorship campaign parameters. Upon the reception of the first client '500' request in FIG. VI step '50', the PCEF forwards the request to the sponsorship application server via call '44' which validates if the requested URL is actually sponsored. Upon positive determination of eligibility to sponsorship the sponsorship application server '400' forwards via step '40' the request to the UDSS proxy server '202'. The UDSS proxy server implements a mechanism to perform protocol and data integrity checks as well as lookup any active cached matching campaign parameters. In the event of a cache miss, the UDSS proxy server '202' relays '20' the request to the UDSS application server '201'. In the event the request is validated and matched to an active sponsorship campaign, the UDSS application server '201' returns the matching sponsorship campaign parameters associated to the calling subscriber device '500' IP address. The UDSS application server '201' submits a request '21' to the OCS '402' via the operator's application programming interface '403'. Upon reception then validation of campaign parameters and association with the user's device, the OCS acknowledges by submitting an Rx request from the incoming REST request that was previously relayed thereto from UDSS application server '201' through steps '21' & '43'. The built Rx request is forwarded '45' to the PCRF '401'. In turn, at step '46', the PCRF '401' interrogates the OCS '402' via the Sy interface about the charging policy report, and at step '47', the OCS answers the PCRF with the initial charging policy report associated with the SSG_ID which is uniquely associated with one active sponsorship data plan. At step '48' the PCRF '401' selects a new PCC-Rule and forwards it for enforcement by the PCEF '404'. At step '49' the PCEF '404' acknowledges the installation of the newly acquired PCC-Rule for the SSG_ID. This acknowledgement is further relayed to the UDSS Application Server '201' through steps '51' & '52'. At this point the UDSS Applications Server '201' provides the UE '500' with the URL to access the already validated sponsored content and relays the said URL through steps '53', '54', '55', and '56'. The rest of the steps, in FIGS. V & VI, '57' to '63' are standard 3GPP steps and are shown for completion and compliance only.

BRIEF DESCRIPTION OF THE DRAWINGS

The following detailed description refers to the figures above in this document. However, the invention disclosed herein may take form in various components and arrangements of components, and in various steps and arrangements of steps. The multiple arrangements are due to the multitude of environments in the operators' implementations. The drawings are only for the purpose of illustrating the envisioned high level architecture.

DETAILED DESCRIPTION OF THE DRAWINGS

Figure 1:
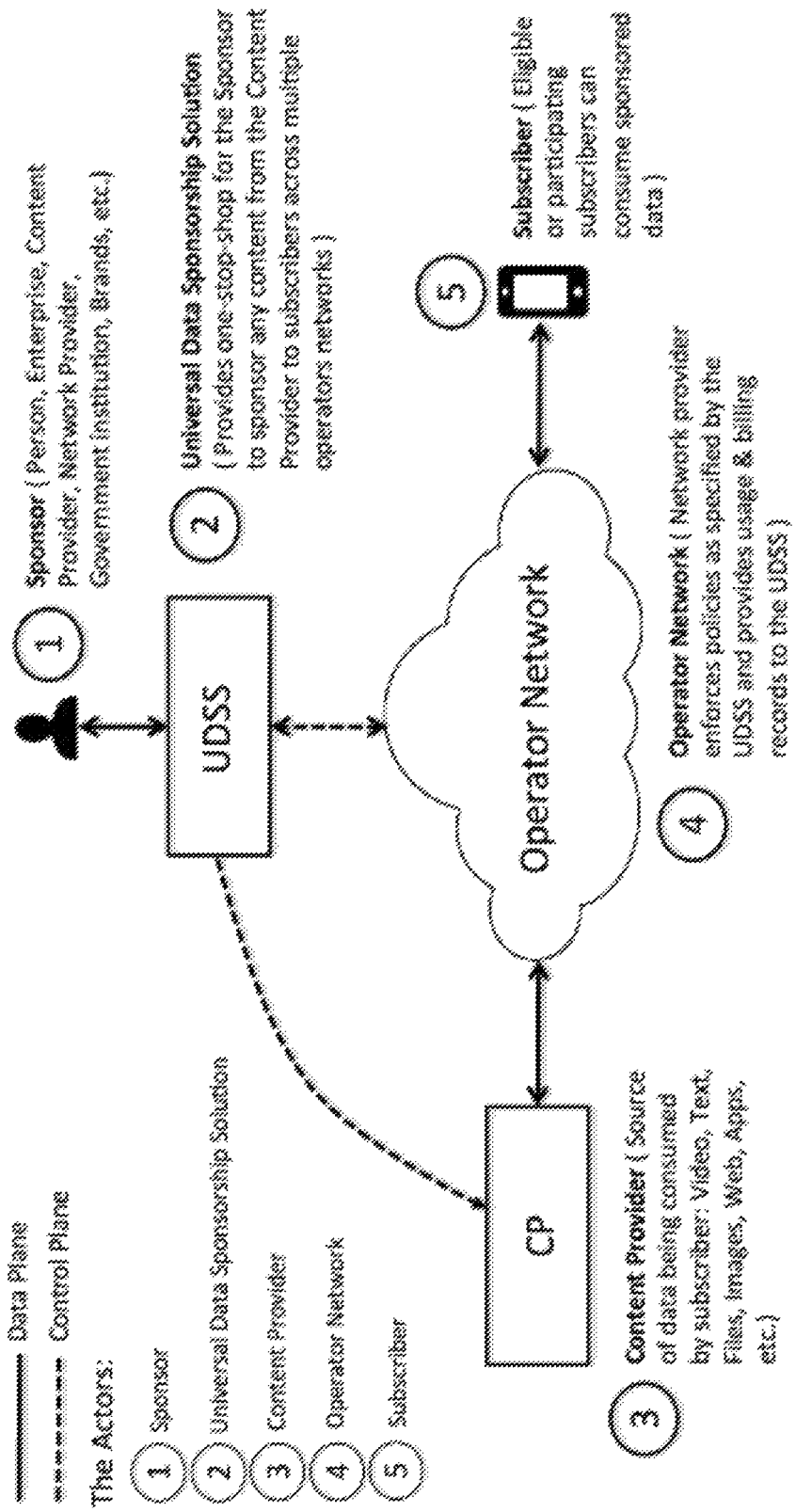
FIG. 1 captures the actors and their roles and relationships in a sponsorship campaign. The present invention provides the advantage of allowing sponsors to engage directly with consumers without having to have a relationship with operators.
Figure 2:
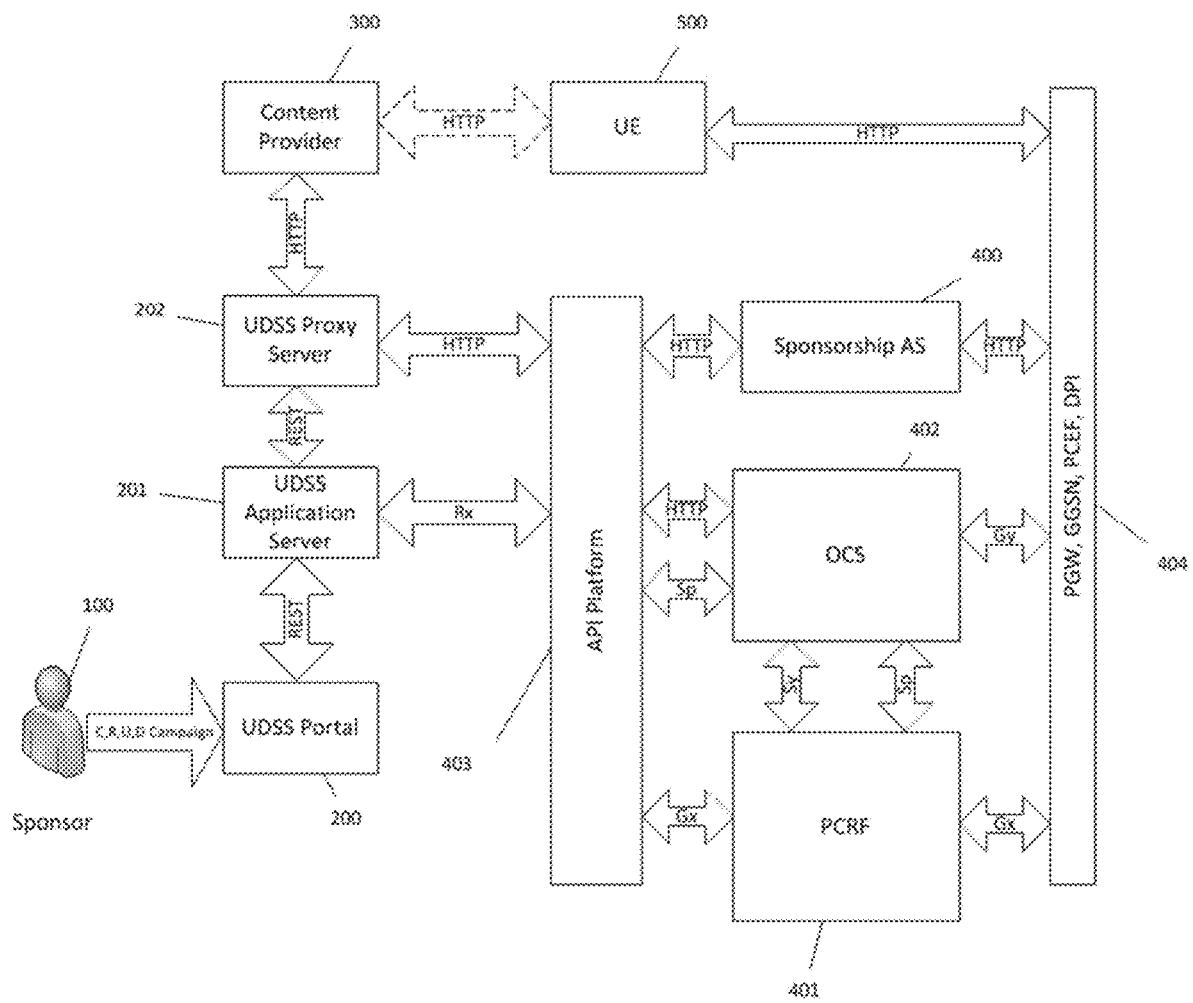
FIG. 2 illustrates the building blocks of the architecture and shows the protocols used to integrate the components from all the actors involved in a sponsorship campaign.
Figure 3:
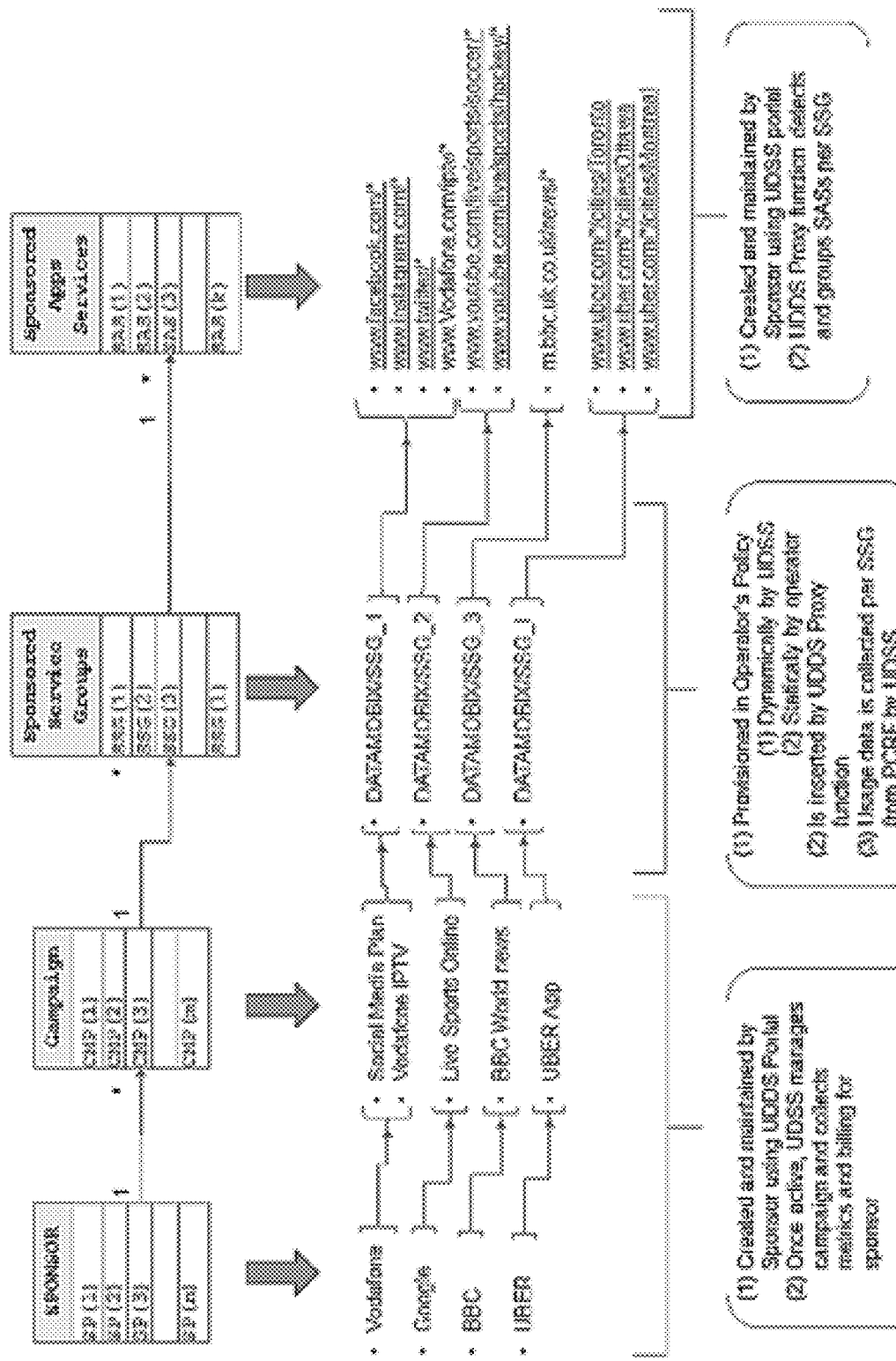
FIG. 3 shows an example of the main data structures and relationships that enable the creation and tracking of sponsorship campaigns. The root data structure is the "SPONSOR" entity that is used to store and retrieve sponsor accounts. A SPONSOR entity is linked to one or many "CAMPAIGN" data structures each of which track an individual sponsorship campaign. A "CAMPAIGN" entity is linked to one or many "SPONSORSHIP SERVICE GROUP" (SSG) entities. Each SSG entry contains a unique Anonymous String Pattern (ASP) that is detected by the operator's policy control. Every SSG entry is linked to one or many "SPONSORED APPS SERVICES" (SAS) entities which links every SSG to one or many sponsored services and URLs. As shown in FIG. III example, the present inventive subject matter allows to create scalable, flexible yet manageable sponsorship campaigns by offering a method and procedure to drive operator's billing policies without the requirement of a client residing SDK.
Figure 4:
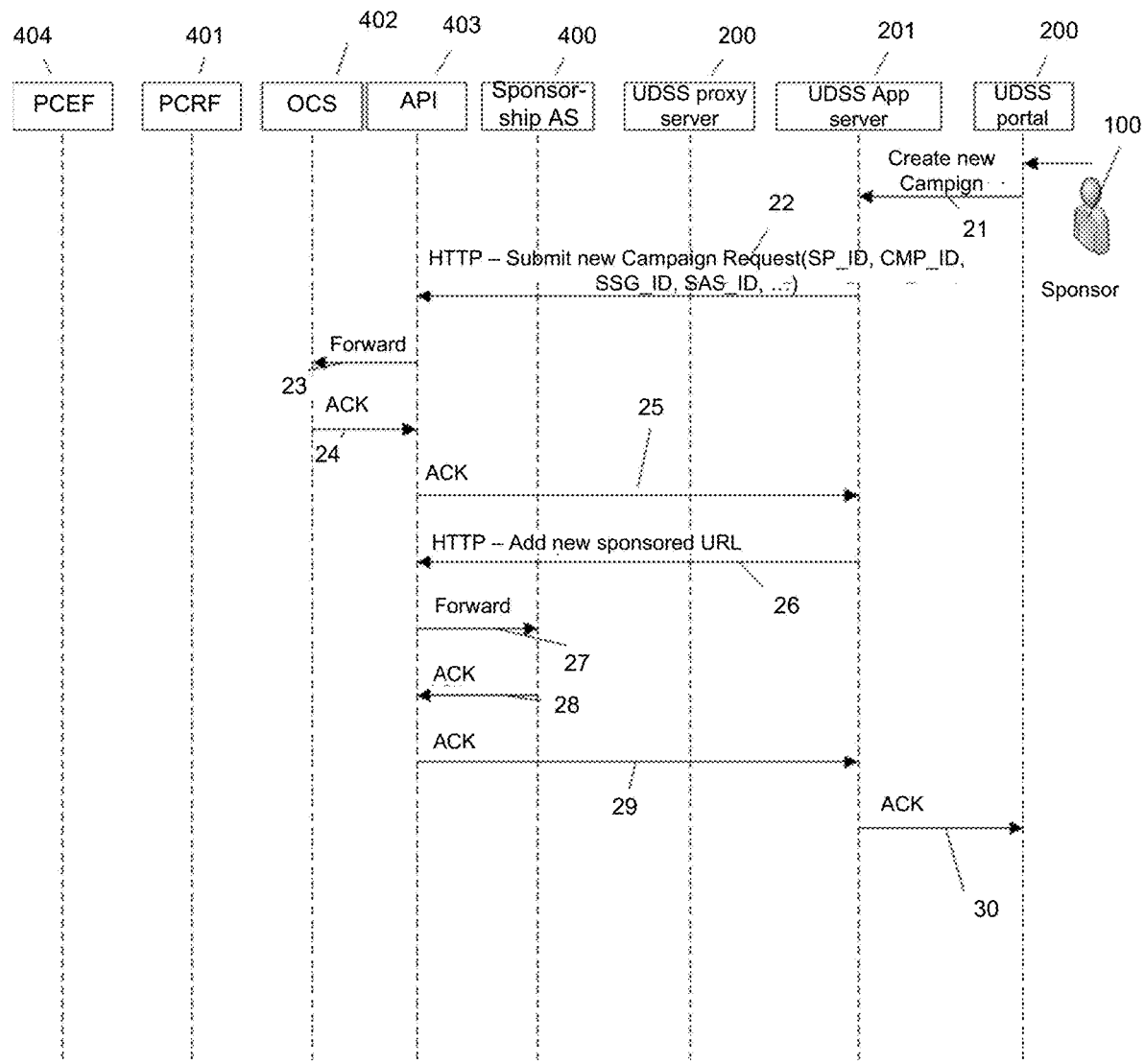
FIG. 4 shows the call flow representing one embodiment of the present invention where the sponsor creates, reads, updates and deletes their sponsorship campaign using the UDSS portal.
Figure 5:
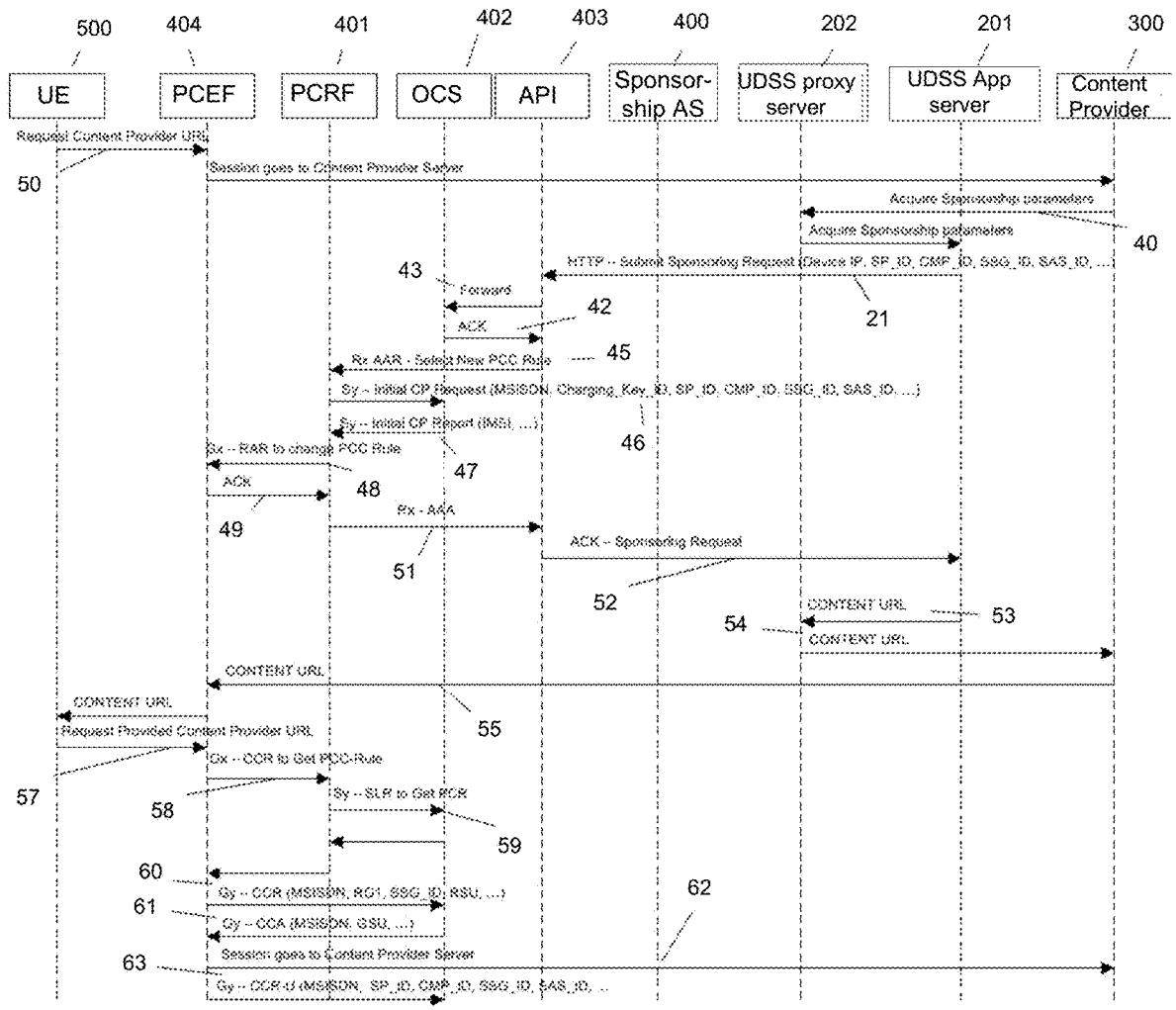
FIG. 5 shows the call flow representing one embodiment of the present invention where the content provider forwards their users' sponsorship requests to the UDSS for sponsorship eligibility check, campaign parameters validation and session establishment with the content provider to consume the sponsored content.
Figure 6:
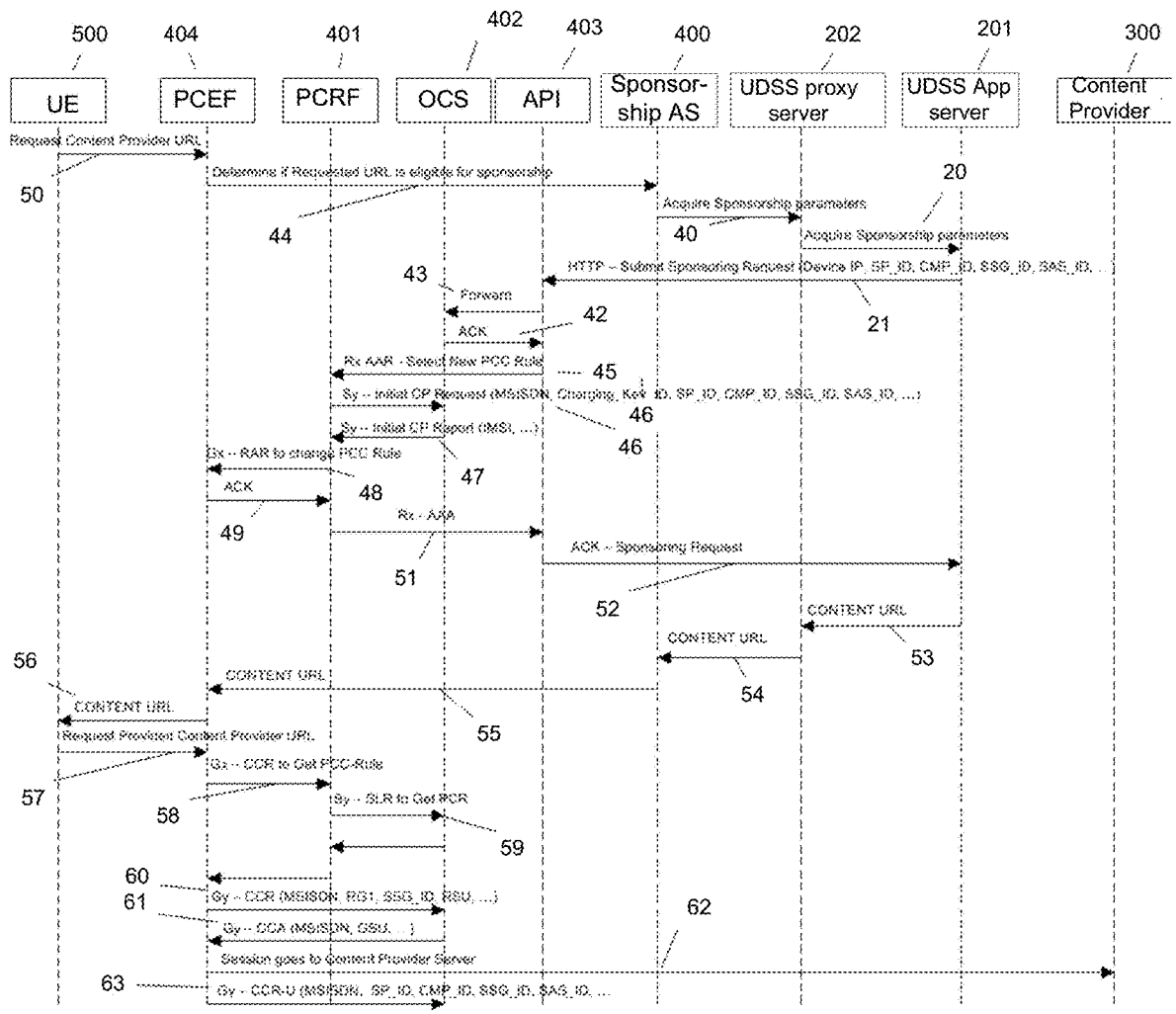
FIG. 6 shows the call flow representing one embodiment of the present invention where the operator forwards their subscriber's sponsorship requests to the UDSS for sponsorship eligibility check, campaign parameters validation and session establishment with the content provider to consume the sponsored content.

For clarity and for simplicity, the present technical description refers to structural and functional elements, relevant standards and protocols, and other components that are commonly known in the art without further detailed explanation as to their configuration or operation except to the extent they have been modified or altered in accordance with and/or to accommodate the preferred embodiment presented here.

Mobile customers can be hesitant to engage with brands and indulge in services they like due to data allowances limitations and fear of bill-shock. Customers want to use more data but most of them can't afford it. Data Sponsorship is becoming a way for operators to generate more revenue and for Sponsors to engage with their existing subscribers and/or acquire new ones. One approach has dominated all sponsorship solutions so far is based on client application to indicate to the operator what data is being sponsored during usage. These approaches are showing low penetration because the barrier to entry is very high, because it requires the installation of a specific App or SDK integration. App developers have to integrate their applications with a specific SDK to enable sponsorship campaigns. This limits the ability to sponsor an app and limits the way sponsorship campaigns are created, personalized and monitored. Also, this approach and its variants may work when sponsoring a specific application on a specific operator network, which creates challenges with regards to net neutrality. The present invention purpose is to create a cloud solution that offers a one stop shop for Sponsors to enable them to sponsor wireless cellular data usage directly related to their content or third party content (i.e. the sponsored content). The UDSS invention integrates, through standard interfaces, with operator's billing and usage platforms and allows the Sponsor to engage with all subscribers across multiple network operators. The UDSS also enables targeting of one or multiple geographic regions. The UDSS solution offers the sponsor a convenient way to track their sponsorship campaign performance and analytics using a customizable dashboard. The value proposition of the UDSS solution can be summarized below:

For Operators:

It enables network operators with exposed technical capabilities to be consumed by external parties (i.e. Sponsors) as value added services. Multiple use cases exist that generate additional revenue for network operators through the increase of data usage.

For Brands (Sponsors):

It creates a one stop shop for brands & content providers at scale with targeting capabilities and performance KPIs— No need to negotiate with each operator separately.

For Consumers:

It enables consumers to "pull" extra savings on their data packages. Data such as Ads and Apps downloads could be sponsored by brands and therefore be free of charge for consumers.

For Regulators:

The UDSS levels the playing field across multiple operators on one side, and it is open to all brands & content providers on the other side. It bridges between network operators and Brands/CPs in a way that satisfies the regulatory requirements for Net-neutrality required in some jurisdictions.

As shown in FIG.. I: A Sponsor can be a person, an Enterprise, Content Provider, Network Provider, Government institution, Brand, and any other data based service provider.

The UDSS provides one-stop-shop for the Sponsor to sponsor any content from the Content Provider to subscribers across multiple operators' networks. The Content Provider is the source of data being consumed by subscribers, data could be Video, Text, Files, Images, Web, Apps, etc. The Operator Network enforces policies as specified by the UDSS and provides usage & billing records to the UDSS. And finally the subscribers who are participating in a campaign can consume the sponsored data without affecting their data allowances.

A sponsorship campaign is defined by a data model encompassing at least the entities and relationships described in FIG. III.

Described herein is a method and system providing end-to-end creation and management of sponsored data plans that apply across multiple operator networks and geographies using UDSS as a one stop shop.

During sponsorship campaigns creation and configuration, UDSS captures the sponsor's campaign parameters defined in the data model and interacts with operators' OCS and PCRF through an exposed Application Programming Interface (API) platform. Sponsored services are known at the time of sponsorship campaign creation, during this phase, the UDSS registers the sponsorship campaign parameters with the operators' OCS and Sponsorship Application Server. Requests to register subscribers to sponsored data plans are submitted by UDSS to the network operator's OCS via the API platform. A mechanism is provided to detect sponsored data sessions. The provided detection mechanism operates at layer 7 of the ISO/OSI model but not exclusively as it can adapt to the operator's environment capabilities. Following is the detailed description of the current invention:

1. This invention allows one or more Cloud Content Provider to define the context by which all or part of an operator's subscriber data usage is billed to a Data Sponsor.

2. The Data Sponsor may differ from the Content Provider,

3. The Data Sponsor uses UDSS portal to create an account and setup, define, orchestrate and activate a data sponsorship campaign simultaneously in one or more geographic regions and transparently reaching out to subscribers across multiple network operators.

4. The data sponsor is provided with a tool to define campaign parameters like targeted geography, frequency and time length and/or boundaries as well as campaign cost cap value.

5. The data sponsor is also provided a total campaign cost estimation that the sponsor accepts by providing their payment credentials, 6. After sponsor payment credentials are validated, the campaign activates and ends as set by the sponsor.

7. The UDSS provides the data sponsor with a token which binds cryptographically data sponsor identity, campaign information and related restrictions. The token's role is to guarantee sponsored data calls are authentic.

8. For every data sponsor one or more campaigns are associated with one Sponsored Service Group (SSG) identifier 9. Every SSG identifier maps to an obfuscated Anonymous String Pattern (ASP) that is key to a sponsored data detection 10. The UDSS proxy function is responsible for inserting the SSG's ASP into a designated header 11. When a subscriber sends a sponsored request to the content provider, two scenarios are possible:

a. The content provider infrastructure attaches the previously provided token with the request and forwards the request to UDSS proxy instance. This is the case when the Content Provider infrastructure allows detection and proxy of sponsored requests.

b. The operator network detects the sponsored service check subscriber eligibility then proxies the request to the UDSS trusted proxy tier.

12. The UDSS proxy validates the token (applies only when step 11.a is executed) and inserts an ASP in a designated header corresponding to the SSG.

13. The Proxy/Content Provider sends a content URL in the response, with the final sponsored service URI in the appropriate header, to the client via the operators network 14. The operator's PCEF detects the SSG as per flows in FIG. V and FIG. VI.

15. The PCEF pulls current rules from the PCRF which replies with the rule that will extract the target URI from the appropriate header and makes the appropriate policy settings including starting the billing to the appropriate charging key.

16. The operator's PCRF appropriate rule is executed and the usage of sponsored service is properly accounted for by the operator's billing systems 17. The operator's PCC system is configured to notify the eligible subscriber about the fact that the content is sponsored. Multiple types and methods of notifications may be used.

18. The UDSS retrieves the real-time sponsored data usage records in near real-time as permitted by operator network configuration and aggregates the usage per sponsor's dashboard configuration.

19. UDSS keeps the sponsor's billing records up-to-date and automatically bills the sponsor.

20. UDSS retrieves usage data including time, aggregate usage data volumes per campaign and provides analytical reports in a dashboard to the sponsor.

EXAMPLES

Example 1

A method for creating and managing Sponsored Data Plans in a geographic area spanning across multiple mobile telecommunications networks comprising: (a) UDSS Portal (200) receiving Sponsorship campaign parameters and UDSS Application Server (201) accepting and propagating resulting policies and configurations to the relevant network operators' OCS (402) and Sponsorship Application Server (400) components based on the campaign targeted geographic areas received by the UDSS Application Server (201) from the UDSS Portal (200). (b) UDSS Proxy Server (202) that implements a mechanism to perform protocol and data integrity checks as well as lookup any active cached matching campaign parameters. (c) The methods implemented by the UDSS Application Server (201) together with the methods implemented by the UDSS Proxy Server (202) eliminate the need for client SDK integration in the UE (500). (d) Sponsorship Application Server (400) inside the operator's network implementing methods for the purpose of determining the operator's subscriber eligibility to the sponsored content. (e) UE (500) sending a first request for a sponsored content and operator's PCEF (404) receiving the said first request and forwarding it to the Sponsorship Application Server (400) for determination of sponsorship eligibility of the requested service. (f) A method to insert campaign parameters implemented in the UDSS Application Server (201), where in case the said first request from the UE (500) is eligible for sponsorship; the Sponsorship Application Server (400) forwards the request to the UDSS Application Server (201) to insert the said campaign parameters. (g) A method by which the UDSS Application Server (201) builds appropriate response to the said first request from the UE (500) containing sponsorship parameters such as sponsor identifiers, SSG_ID and other parameters as needed along with the sponsored service URL. (h) A method by which the UDSS Application Server (201) collects the sponsored data usage and billing records from the OCS (402) through the API Platform (403), re-conciliate billing records, and generates the bill for each sponsorship campaign. (i) A method by which the UDSS Application Server (201) collects analytical data about sponsored data usage volume, time, and duration of campaigns from OCS (402) and/or PCRF (401) through the API Platform (403).

Example 2

The method of Example 1, said method further comprising exposing an API to allow the initial staging of the sponsor and the sponsorship campaign in the operator's OCS (402) and the Sponsorship Application Server (400)

Example 3

The method of Example 2 wherein said first request is received by PCEF and routed to the Sponsorship Application Server for eligibility check Example 4

The method of Example 2 wherein the data structure obstructs the sponsorship details in the SSG.

Example 5

The method of Example 2 wherein the presence of the SSG in the response triggers appropriate rule and sets the operator billing to the sponsor's charging ID.

Example 6

The method of Example 2 wherein the SSG binds the sponsor and the sponsorship campaign to the sponsored service for as long as the sponsorship campaign is active.

Example 7

The method of Example 1 wherein the UDSS maintains a structured data model that allows flexibility of sponsorship campaign creation and management across multiple geographies and operator networks.

The invention claimed is:

1. A system for creating and managing Sponsored Data Plans in a geographic area spanning across multiple mobile telecommunications networks comprising:

a Universal Data Sponsorship Solution (UDSS) Portal to receive Sponsorship campaign parameters from a Sponsor entity, wherein the Sponsorship campaign parameters are indicative of a sponsored service group identifier (SSG_ID); and a UDSS Application Server to accept and propagate resulting policies and configurations to a relevant network operators' Online Charging System (OCS) and Sponsorship Application Server components based on the campaign targeted geographic areas received by the UDSS Application Server from the UDSS Portal, wherein the policies are indicative of the SSG ID and a sponsored service URL, wherein the OCS comprises a charging function of the relevant network operator.

2. The system of claim 1, further comprising a UDSS Proxy Server to:

implement a mechanism to perform protocol and data integrity checks; and look up any active cached matching campaign parameters.

3. The system of claim 1, wherein the Sponsorship Application Server inside the operator's network is to determine the operator's subscriber eligibility to the sponsored content.

4. The system of claim 3, further comprising:

a user equipment (UE) to send a first request for a sponsored content; and an operator's Policy and Charging Enforcement Function (PCEF) to receive the first request and forward the first request to the Sponsorship Application Server for determination of sponsorship eligibility of the requested service.

5. The system of claim 4, wherein the UDSS Application Server is further to build an appropriate response to the first request from the UE containing sponsorship parameters and the sponsored service URL, wherein the sponsorship parameters include sponsor identifiers or SSG_ID.

6. The system of claim 5, wherein the presence of the sponsorship service group (SSG) in the response triggers appropriate rule and sets the operator billing to the sponsor's charging ID.

7. The system of claim 6, wherein the SSG binds the sponsor and the sponsorship campaign to the sponsored service for as long as the sponsorship campaign is active.

8. The system of claim 1, wherein the UDSS Application Server is further to collect the sponsored data usage and billing records from the OCS through an API Platform, re-conciliate billing records, and generate a bill for each sponsorship campaign.

9. The system of claim 1, further comprising an API Platform to expose an API to allow the initial staging of the sponsor and the sponsorship campaign in the operator's OCS and the Sponsorship Application Server.

10. The system of claim 1, wherein the UDSS Application Server is further to maintain a structured data model that allows flexibility of sponsorship campaign creation and management across multiple geographies and operator networks.

11. A method for creating and managing Sponsored Data Plans in a geographic area spanning across multiple mobile telecommunications networks comprising:

receiving, by a Universal Data Sponsorship Solution (UDSS Portal), Sponsorship campaign parameters from a Sponsor entity, wherein the Sponsorship campaign parameters are indicative of a sponsored service group identifier (SSG_ID); and accepting and propagating, by a UDSS Application Server, resulting policies and configurations to a relevant network operators' Online Charging System (OCS) and Sponsorship Application Server components based on the campaign targeted geographic areas received by the UDSS Application Server from the UDSS Portal, wherein the policies are indicative of the SSG_ID and a sponsored service URL, wherein the OCS comprises a charging function of the relevant network operator.

12. The method of claim 11, further comprising determining, by the Sponsorship Application Server inside the operator's network, the operator's subscriber eligibility to the sponsored content.

13. The method of claim 12, further comprising:

sending, by a user equipment (UE), a first request for a sponsored content;

receiving, by an operator's Policy and Charging Enforcement Function (PCEF), the first request; and forwarding, by the operator's PCEF, the first request to the Sponsorship Application Server for determination of sponsorship eligibility of the requested service.

14. The method of claim 13, further comprising building, by the UDSS Application Server, an appropriate response to the first request from the UE containing sponsorship parameters and the sponsored service URL, wherein the sponsorship parameters include sponsor identifiers or SSG_ID.

15. The method of claim 14, wherein the presence of the sponsorship service group (SSG) in the response triggers appropriate rule and sets the operator billing to the sponsor's charging ID, and wherein the SSG binds the sponsor and the sponsorship campaign to the sponsored service for as long as the sponsorship campaign is active.

16. One or more non-transitory, computer-readable storage media comprising a plurality of instructions that in response to being executed cause a system to:

receive, by a Universal Data Sponsorship Solution (UDSS) Portal, Sponsorship campaign parameters from a Sponsor entity, wherein the Sponsorship campaign parameters are indicative of a sponsored service group identifier (SSG_ID); and accept and propagate, by a UDSS Application Server, resulting policies and configurations to a relevant network operators' Online Charging System (OCS) and Sponsorship Application Server components based on the campaign targeted geographic areas received by the UDSS Application Server from the UDSS Portal, wherein the policies are indicative of the SSG_ID and a sponsored service URL, wherein the OCS comprises a charging function of the relevant network operator.

17. The one or more non-transitory, computer-readable storage media of claim 16, further comprising a plurality of instructions that in response to being executed cause the system to:

implement, by a UDSS Proxy Server, a mechanism to perform protocol and data integrity checks; and look up, by the UDSS Proxy Server, any active cached matching campaign parameters.

18. The one or more non-transitory, computer-readable storage media of claim 16, further comprising a plurality of instructions that in response to being executed cause the system to determine, by the Sponsorship Application Server inside the operator's network, the operator's subscriber eligibility to the sponsored content.

19. The one or more non-transitory, computer-readable storage media of claim 18, further comprising a plurality of instructions that in response to being executed cause the system to:

send, by a user equipment (UE), a first request for a sponsored content;

receive, by an operator's Policy and Charging Enforcement Function (PCEF), the first request; and forward, by the operator's PCEF, the first request to the Sponsorship Application Server for determination of sponsorship eligibility of the requested service.

20. The one or more non-transitory, computer-readable storage media of claim 19, further comprising a plurality of instructions that in response to being executed cause the system to build, by the UDSS Application Server, an appropriate response to the first request from the UE containing sponsorship parameters and the sponsored service URL, wherein the sponsorship parameters include sponsor identifiers or SSG_ID.

* * * * *